United States Patent [19]

Sanglert

[11] 3,963,938
[45] *June 15, 1976

[54] APPARATUS FOR SCANNING CANTS TO DETERMINE OPTIMUM EDGING CUTS

[75] Inventor: Benkt Sanglert, Jonkoping, Sweden

[73] Assignee: Saab-Scania Aktiebolag, Linkoping, Sweden

[ * ] Notice: The portion of the term of this patent subsequent to May 27, 1992, has been disclaimed.

[22] Filed: Apr. 16, 1975

[21] Appl. No.: 568,608

[30] Foreign Application Priority Data
Apr. 22, 1974    Sweden ............................ 7405346

[52] U.S. Cl. ............................ 250/561; 144/312; 250/223; 250/571
[51] Int. Cl.² ........................................ G01N 21/30
[58] Field of Search .......... 250/560, 561, 571, 223; 356/199, 201; 209/111.7; 144/312, 313

[56] References Cited
UNITED STATES PATENTS

| | | | |
|---|---|---|---|
| 3,736,968 | 6/1973 | Mason | 144/312 |
| 3,802,774 | 4/1974 | Eschler et al. | 250/560 |
| 3,806,252 | 4/1974 | Harris et al. | 250/560 |
| 3,856,412 | 12/1974 | Zanoni | 250/560 |
| 3,886,372 | 5/1975 | Sanglert | 250/571 |
| 3,890,509 | 6/1975 | Maxey | 250/561 |
| 3,897,156 | 7/1975 | Chasson | 144/312 |

*Primary Examiner*—Alfred E. Smith
*Assistant Examiner*—D. C. Nelms

[57] ABSTRACT

An elongated workpiece having unfinished side surfaces inclined laterally downwardly and outwardly from a finished top surface is scanned to produce signals denoting location of the longitudinal edges of the top surface at numerous points along them. A swinging plane mirror defines an elongated scanning zone which extends across the workpiece and is translated all along it. The workpiece is alternately illuminated from opposite sides at a low angle of incidence to its top surface to shadow first one side surface, then the other. Scanning lengthwise along the scanning zone is synchronized with translation of that zone and with lighting alternation. A preferred apparatus is disclosed for establishing a reference line on the workpiece to which scanning data can be related.

8 Claims, 5 Drawing Figures

APPARATUS FOR SCANNING CANTS TO DETERMINE OPTIMUM EDGING CUTS

This application is a companion to my application Ser. No. 445,429, filed Feb. 25, 1974, now U.S. Pat. No. 3,886,372, which discloses and claims related subject matter, and I have disclaimed the terminal part of any patent granted on this application which would extend beyond the expiration date of said U.S. Pat. No. 3,886,372.

This invention relates to apparatus for measuring the area and configuration of a finished surface on a partly finished workpiece, for the purpose of determining the edge trimming that will convert the workpice to a finished piece of optimum size; and the invention is more particularly concerned with the production of signals which can be utilized by a computer and which denote the location of edges of a finished surface on a partly finished workpiece.

The type of workpiece that presents the problem with which the present invenion is concerned is exemplified by an unedged cant that has been sawed from a log. It will be understood, however, that the invention is also applicable to the finishing of other types of partly finished workpieces, such as the cropping of a steel bloom in a rolling mill. Hence the following discussion and explanation is limited to cants merely for purposes of simplification and by way of example.

A cant is an elongated piece having substantially flat and parallel top and bottom finished surfaces but having wanes or unfinished longitudinal side surfaces which may be very irregular and which are usually oblique to the top and bottom surfaces. A certain amount of wood is inevitably wasted in edge trimming a cant to convert it to a finished piece having straight, parallel side surfaces that are accurately perpendicular to the already-finished top and bottom surfaces. To minimize such waste, the orientation and spacing of the finishing cuts must be planned with due regard for the configuration of the narrower one of the two finished surfaces of the cant, which narrower surface can be regarded as its top surface.

It has been recognized for some time that a computer could be utilized for calculating the most advantageous orientation and spacing of the finishing cuts. Obviously the computer requires inputs denoting the location of each of a number of points at spaced intervals along each longitudinal edge of the top surface of the workpiece. The above identified companion application discloses, in principle, a method and apparatus for scanning a cant to obtain such inputs with reasonable speed and accuracy. However, in practical lumber trimming a substantially greater speed and accuracy are required than can be attained with the particular apparatus disclosed in that application. It is the general object of the present invention, therefore, to provide apparatus for cant scanning which embodies the principles of the invention disclosed and claimed in said companion application but which is much more rapid and accurate in operation, can be built more easily and at lower cost for a given capacity, and is well adapted for operation with cants of greatly varying lengths.

It is also a general object of the present invention to provide cant scanning apparatus that comprises a stationary photocell unit and a simple, flat mirror, swingably mounted and driven to cooperate with the photocell unit in producing a rapid succession of signals which denote the location of each of the opposite longitudinal edges of the top surface of a cant or similar partly finished workpiece at each of a large number of stations that extend across the workpiece and are spaced from one another at close intervals along its length.

It is a further object of this invention to provide a method and apparatus for scanning a cant while it is being held stationary at a scanning station and whereby it is possible to establish a lengthwise extending reference line on the cant that coincides during scanning with a fixed datum line at the scanning station and can subsequently be employed in orienting the cant for feed through edging cutters with a translatory motion in a direction parallel to the datum line, such orientation establishing said reference line at such an angle to said datum line, as determined by calculations based upon the data obtained from scanning, that the edging cutters will trim the cant to a finished piece of economically optimum size.

Another and very important object of the invention is to provide apparatus for scanning a cant in the above described manner, which apparatus, in addition to being extremely fast and very accurate, lends itself to use with cants of widely varying lengths and requires minimal floor area.

The extent to which the invention achieves its objective of obtaining very rapid scanning is indicated by the fact that with a machine embodying the present invention a complete scanning of a cant having a length of about three meters can be accomplished in about one-half second.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate two complete examples of embodiments of the invention constructed according to the best modes so far devised for the practical application of the principles thereof, and in which.

Figure 1:
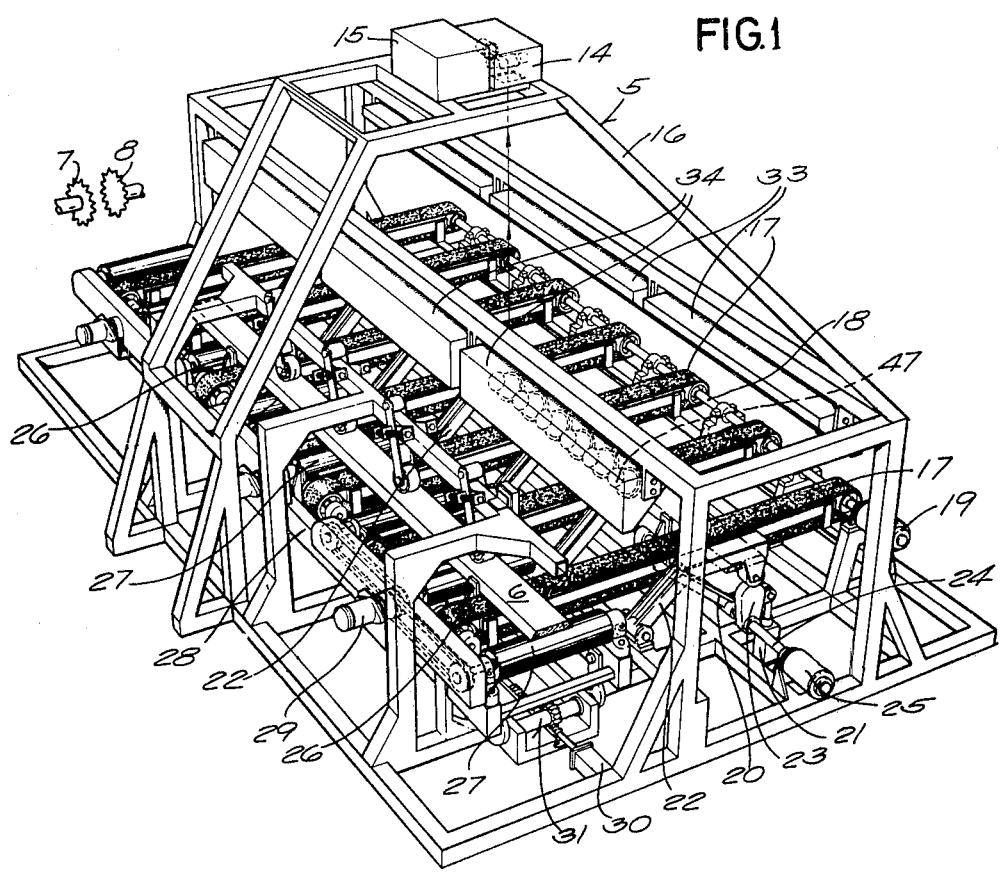
FIG. 1 is a perspective view of a machine which embodies scanning apparatus of this invention and which provides for transport of a cant to a scanning station at which scanning takes place and thence to an orienting station at which the cant is oriented for feed through edging cutters in accordance with calculations based upon the scanning data.
Figure 2:
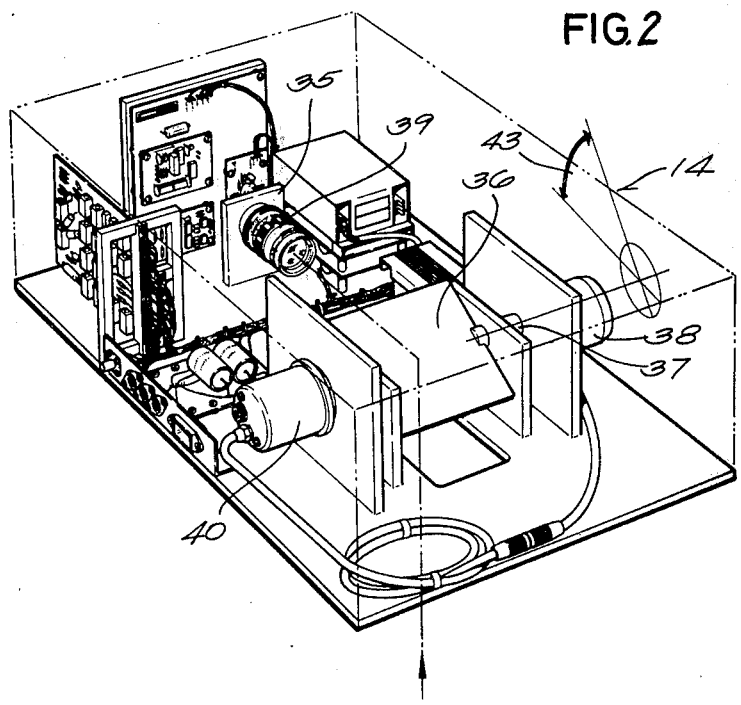
FIG. 2 is an enlarged perspective view of the scanning apparatus of the machine shown in FIG. 1.

Referring now to the accompanying drawings, the numeral 5 designates generally a machine by which an elongated, partly finished workpiece 6 can be scanned and by which the workpiece can be moved to an orienting station at which it is established in a desired orientation for substantially lengthwise translatory feed through a pair of edging cutters illustrated as two saw blades 7 and 8. The workpiece 6 is here illustrated as a cant that has been sawed from a log and has only its top and bottom surfaces finished. The opposite longitudinal side surfaces or wanes 9 and 10 of the cant, which are unfinished and may be somewhat irregular, extend obliquely downwardly and laterally outwardly from the finished top surface II.

In being fed through the edging cutters, the cant 6 is to have its opposite side portions removed, so that it will be brought to the form of a parallelopiped, with accurately straight and parallel side surfaces that will be perpendicular to the top and bottom surfaces. The cuts made by the cutters must convert the cant to a finished board of standardized width, with minimum waste of stock.

The amount of material in the cant that is available for finished product obviously depends uoon the configuration of the narrower of the two finished surfaces of the partly finished workpiece. This is to say that the finishing cuts are calculated upon the basis of the shape and spacing of the longitudinal side edges 12 and 13 of the finished top surface 11, said edges being defined by the junction of that top surface with the wane surfaces 9 and 10.

Information about the configuration of the top surface 11 is obtained from scanning apparatus 14 that is described hereinafter. Such information is generated in the form of signals that correspond to the distance between each of the edges 12 and 13 and a reference line on the cant that can be defined as explained below. The scanning signals are fed to a computer 15 that can comprise known apparatus which utilizes such signals to make a calculation of the orientaton of the cant and the spacing between the cutters 7 and 8 that will afford the economically optimum finishing cuts. The computer issues outputs that automatically effect the proper cant orientation and cutter spacing. The means for spacing the cutters 7 and 8 in response to computer is not shown, inasmuch as such apparatus is well known.

Although the machine 5 comprises the scanning apparatus 14, it essentially constitutes the means for orienting the cant, inasmuch as such orientation is based upon data obtained in the scanning operation, so that the scanning and orienting functions are closely related. The machine 5, apart from its scanning apparatus, is more fully disclosed in the copending application of Ulrick Koklberg, Ser. No. 568,609, filed Apr. 16, 1975, which has a common assignee herewith and to which reference may be made for details not covered in the following general description.

The machine 5 comprises a frame on which there are plurality of parallel, laterally spaced belt conveyors 17, all driven from a common drive shaft 18 to which a motor 19 is coupled. The upper stretches of the several belt conveyors, which lie in a common horizontal plane, are thus driven continuously in a forward direction so that a cant placed upon them with its length transverse to theirs is carried from a loading zone at a rear end of the belt conveyors (the right-hand end as seen in FIG. 1) to a scanning station intermediate their ends, where its motion with the conveyors is arrested while it is scanned. After being scanned, the cant is permitted to resume its forward motion with the belt conveyors, for transport to an orienting station near the front end of the belt conveyors, where its orientation is established as explained hereinafter.

For arresting the cant at the scanning station there are at least two scanning stops 20 at locations laterally spaced from the belt conveyors. Preferably there are a substantial number of such scanning stops, one laterally adjacnet to each belt conveyor; and each scanning stop is movable vertically between a lowered inoperative position (shown in full lines in FIG. 4) and a raised operative position. When a scanning stop is in its inoperative position — which is its normal one — it is disposed wholly below the upper stretches of the belt conveyors, out of the way of a cant thereon. In its operative position, shown in broken lines in FIG. 4, a scanning stop projects above the top stretches of the belt conveyors so that it can engage a cant on them to arrest its forward transport by the conveyors. Each scanning stop can comprise a medially pivoted lever that is swung up and down by a hydraulic or pneumatic motor 21.

Every scanning stop, when in its operative position, has a vertical cant engaging rear face that lies on a datum line which extends transversely to the lengths of the belt conveyors. However, as a cant approaches the scanning station, only two of the several scanning stops are brought to their operative positions, those two being the ones that are nearest to the ends of the cant and inwardly thereof. Selection of the particular two scanning stops that are to engage the cant is effected by sensors (not shown) such as photoelectric cells, which respond to the position and length of the cant and control the scanning stops in a manner that will be apparent to those skilled in the art.

As the cant is carried forward, it is engaged by the two raised scanning stops at two spaced points on its leading edge, which points define a reference line on the cant. While the cant remains stopped at the scanning station, that reference line will coincide with the above mentioned datum line.

Figure 4:
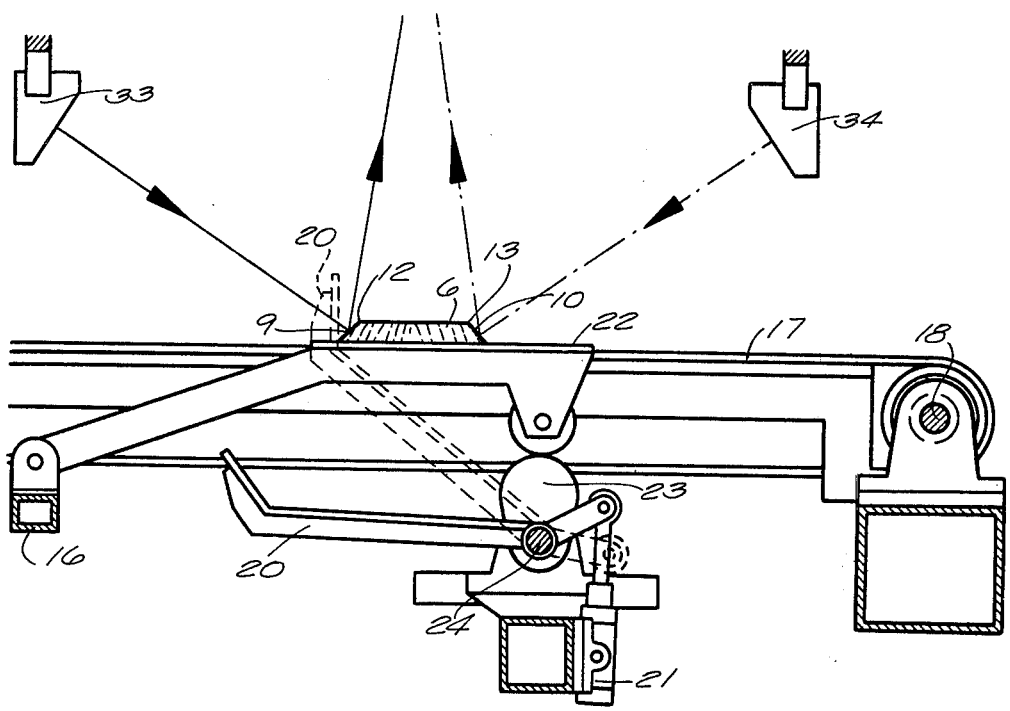
FIG. 4 is a fragmentary view taken on a vertical plane transverse to that of FIG. 3 and illustrating the illumination of a cant at the scanning station of the machine.

The conveyor belts of course continue to move forward under the arrested cant, and to prevent its being jostled by them while it is being scanned, scanning supports 22 that are located between the belt conveyors move up from inoperative positions beneath those conveyors and lift the cant up out of contact with the belt conveyors as shown in FIG. 4. Each scanning support can comprise an arm which is pivoted to the frame 16 at one of its ends and has a cam follower at its other end that rides on a cam 23. The cams 23 for the several scanning supports are mounted on a common shaft 24 to which a motor 25 is coupled, and that shaft is of course rotated through a partial turn to lift or lower the scanning supports. Once the cant is supported on the scanning supports, it can be scanned by the scanning apparatus 14 and the two scanning stops that have arrested it can be returned to their inoperative positions.

After scanning, the scanning supports move back down to their inoperative positions, enabling the cant to resume its forward motion with the belt conveyors by which it is carried towards the orienting station.

At the front end of the machine there are a number of orienting stops 26, one for each scanning stop. Each orienting stop is forwardly aligned with its scanning stop. The several orienting stops are individually adjustable in directions parallel to the belt conveyor stretches (i.e. towards and from the datum line), and they normally occupy inoperative positions at the front ends of the belt conveyors, spaced forwardly of the orienting station. However, when a cant has been scanned, the orienting stops for the two scanning stops that had arrested it are adjustingly moved back to operative positions at the orienting station. The orienting stops of course project above the plane of the top belt stretches for engagement with a cant thereon, and the two that are brought back to the orienting station will rearrest the cant there, engaging the same two points on the leading edge of the cant that were engaged by the scanning stops. Hence those orienting stops lie on the reference line established by the scanning stops. The positions to which those orienting stops are adjusted are controlled by the computer 15, which establishes them at such relative distances from the datum line that when they re-arrest the cant they establish its reference line at the required angular orientation to the datum line for feed through the edging cutters.

The cant is then translated through the edging cutters in a direction exactly parallel to the datum line while being maintained in the orientation established by the orienting stops. To provide for such translatory feeding of the cant through the edging cutters, the machine comprises a roller conveyor with rollers 27 that have their axes in a common horizontal plane and extending parallel to the lengths of the belt conveyors. The several rollers 27 are carried on a subframe 28 which also carries a motor 29 that drives them for rotation in unison.

The roller conveyor is movable bodily up and down, between a normal, inoperative position in which its rollers are spaced below the plane of the top stretches of the belt conveyors and an elevated operative position. It is lifted and lowered by a hydraulic or pneumatic cylinder unit 30 connected with a lengthwise slidable rack 31. The rack cooperates with pinions (only one of which can be seen in FIG. 1) which are confined to rotation and which in turn impart rotation to eccentrics (not visible in the figure) that cooperate with suitable cam followers on the sub-frame.

When a cant is established in engagement with the orienting stops 26, the roller conveyor is raised from its inoperative position and lifts the cant off of the belt conveyors. Before the roller drive motor 29 is started, the two orienting stops that have arrested the cant are moved forward to their inoperative positions so that they cannot disturb the orientation of the cant as the roller conveyor moves it towards the edging cutters.

Returning now to a consideration of the scanning station, elongated light banks 33 and 34 that extend transversely to the conveyor belts are mounted on the frame 16 at a level above the belt conveyors and in position in which they are, respectively, behind and ahead of a cant at the scanning station. Each light bank thus shines obliquely across the top surface of the cant, and the light banks are lighted alternately, in coordination with scanning.

It will be evident (see FIG. 4) that when the lamps 47 of the front light bank 33 illuminate the cant, they shine upon its top surface 11 and upon its forward wane surface 9; but by reason of their low angle of incidence to the top surface they leave the rear wane surface 10 unilluminated, casting a shadow that sharply defines the longitudinal edge 13 of the top surface. Similarly, when the light bank 34 shines on the cant, it illuminates its rear wane surface 10 and its top surface 11 but leaves its front wane 9 in a shadow that sharply defines the longitudinal edge 12.

The scanning apparatus 14 is mounted on the machine frame 16 at a level above the light banks and in a position to be directly over a cant at the scanning station. In general, the scanning apparatus comprises a photoelectric detector unit 35 that has a horizontally elongated slot-like scanning field, a plain flat mirror 36 carried for flatwise rotation on a shaft 37, a motor 38 that is coupled to the shaft to impart swinging motion to the mirror. The image of the upper surface of the cant, which is reflected to the detector unit 35 by the mirror 36, is focused upon the detector unit by means of a lens system 39.

The detector unit can be of the type known as an array, functionally equivalent to 512 photo-electric cells placed along a straight horizontal line and arranged to be scanned or "emptied" electronically with the use of a pulse signal. The axis about which the mirror swings is parallel to the reflecting surface of the mirror and is oriented horizontally and parallel to the belt conveyors. In any given angular position of the mirror, the detector unit thus scans along a line which extends transversely to the length of the cant, and this scan line is in effect translated along the length of the cant by the swinging motion of the mirror on its shaft 35. The rate of scan along the scan line of course depends upon the frequency of the pulse signal. A 50 KHz pulse signal has been found to provide satisfactory results, but substantially higher scanning rates can be obtained, and there is reason to believe that the use of a 1 MHz pulse signal is entirely practical.

Since the position of the scan line along the length of the cant must be known for utilization of the output of the detector unit, and is a function of the angular position of the mirror, a pulse generator 40 is coupled to the mirror shaft, at the end thereof opposite the tilting motor 38. The output signals from the detector means are coordinated with those from the pulse generator to provide signals representative of the location of a succession of points along each of the longitudinal edges 12 and 13 of the top surface of a cant.

All scanning is done with a single reflecting surface of the mirror, to avoid problems that have been found to arise in scanning with mirrors having multiple reflecting surfaces which must be in very precise angular relationships to one another and to the tilting axis of the mirror for scanning accuracy.

Figure 3:
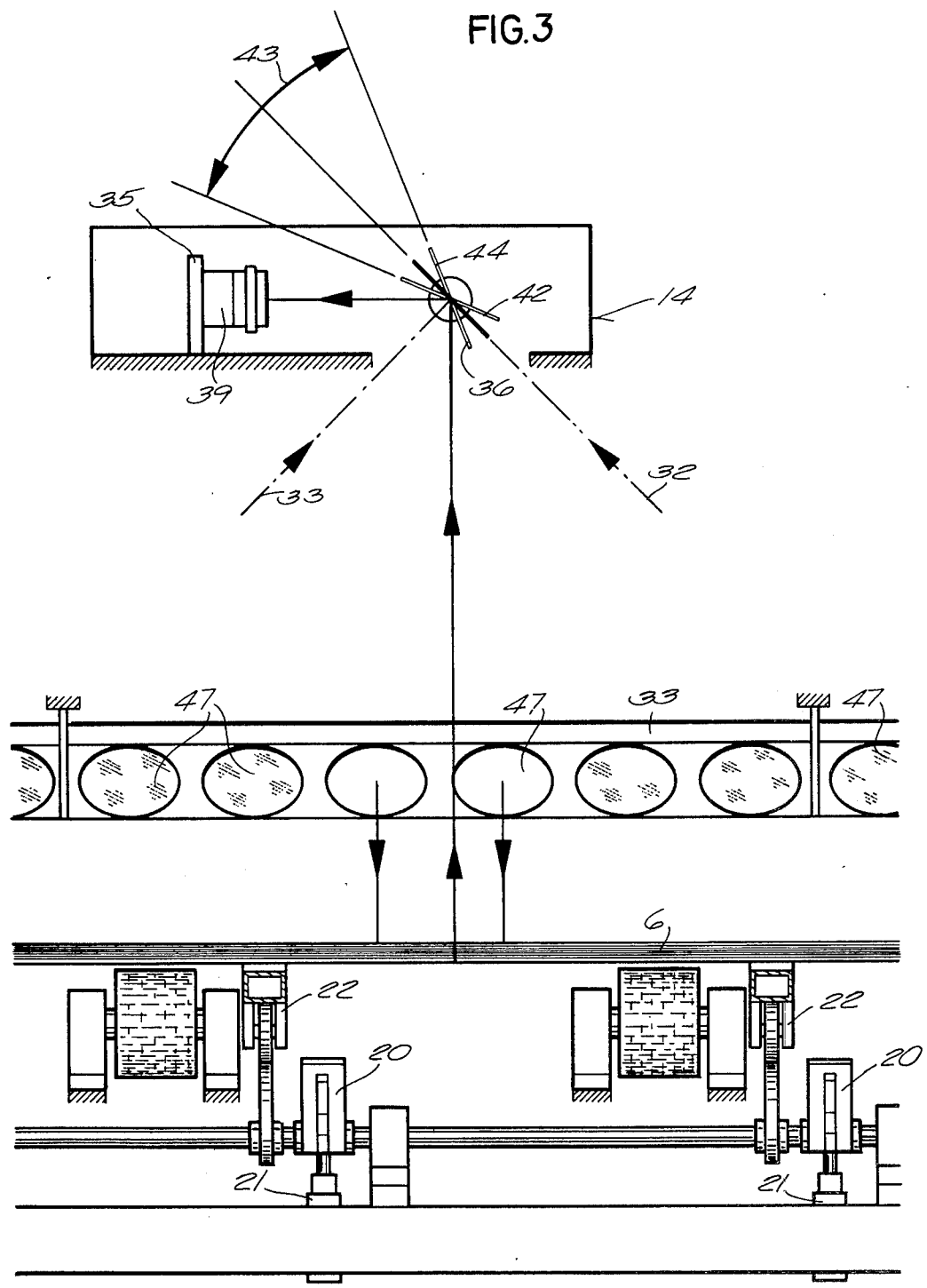
FIG. 3 is a more or less diagrammatic vertical sectional view through the machine, taken on a plane extending lengthwise of the scanning station and illustrating how a cant is measured and scanned with the apparatus of this invention.

For each complete scanning operation the mirror 36 must make two swinging motions or scanning traverses, one for each of the longitudinal edges 12 and 13, and the mirror must have a defined starting position, designated by 42 in FIG. 3, to which it always returns at the conclusion of a complete scanning operation. The first scanning traverse is in one direction from the starting position, through the angle designated by 43, to a terminal position designated by 44. The second scanning traverse can be a return swing in the opposite direction. Alternatively, both scanning traverses can be in the same direction, with a return swing back to the starting position between the two scanning traverses and again after the second one.

In either case, the light bank 17 or 18 at one side of the cant is lighted during one scanning traverse and that at the other side is lighted during the other one. If desired, as indicated in FIG. 4, lamps 47 along the length of a light bank can be lighted successively during the traverse to illuminate only the part of the cant being scanned at each particular moment. Such synchronization of lamp lighting with scanning is attainable in a known manner with the use of the output from the pulse generator 40.

The angle 43 through which the mirror swings is so selected that the scan line will be translated along the entire length of a cant at the scanning station. Because of the light reflected from the top surface of the cant, scanning signals obtained when the scan line is beyond either end of the cant can be readily gated out.

Figure 5:
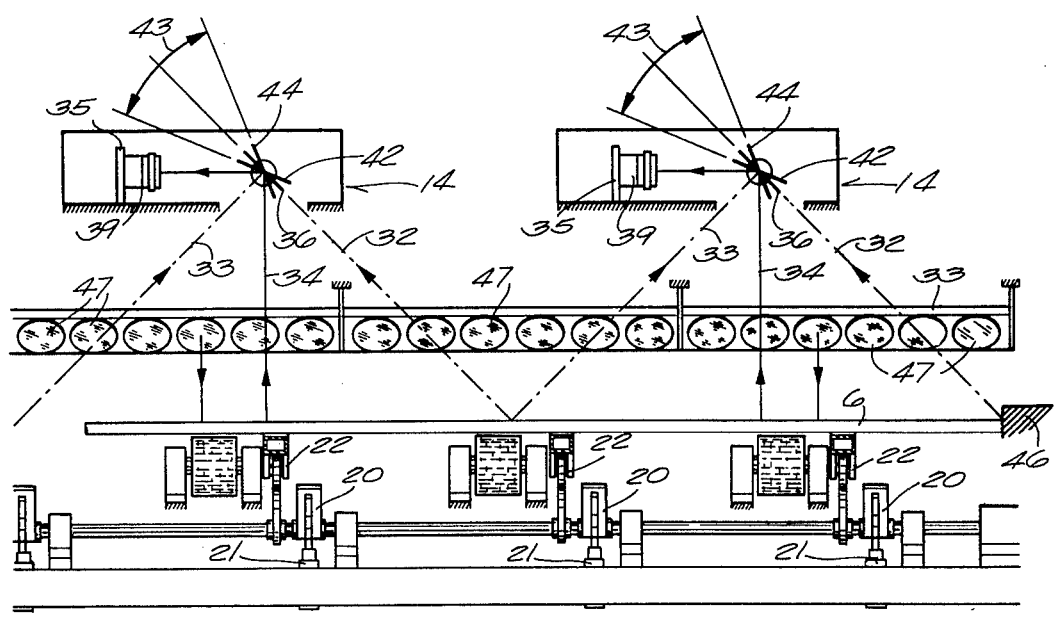
FIG. 5 is a view generally similar to FIG. 3 but showing a modified embodiment of the invention wherein a pair of coordinate scanning devices are employed.

Preferably, each cant it so loaded onto the machine that one end of it is in a predetermined position corresponding to the position of the scan line when the mirror is in its starting position, as by engaging said end of the cant against a suitable abutment 46 on the machine, as illustrated in FIG. 5. The output of the detector unit can then be monitored to terminate swinging of the mirror away from its starting position as soon as the scan line passes beyond the other end of the cant. In this way cants of widely varying lengths can be accommodated, and the scanning time will in each case be proportional to the length of the cant.

Another expedient for substantially reducing scanning time, especially on relatively long cants, is illustrated in FIG. 5, wherein the scanning apparatus 14 comprising the detector unit and the swingable mirror is duplicated, and each scanning apparatus is located and arranged to scan along half the length of the cant. As shown, the mirror of the right hand scanning apparatus has a starting position 42 at which its scan line is at the right hand end of a cant engaged with the abutment 46, while the mirror of the left-hand scanning apparatus has a starting position in which its scan line is about midway between the ends of the cant. The two mirrors move through their scanning traverses in unison, both in the same direction, and the computer 15 must of course be arranged to accommodate the substantially simultaneous inputs from the two detectors 35. The mirror of the right hand unit of course terminates its traverse when its scan line coincides with the starting position of the scan line of the left-hand unit.

With the use of duplicated scanning apparatus as just described, it is possible (as compared with a single scanning apparatus) to double the scanning range along the length of the cant for a given scanning time and mirror swing angle 44, or to halve the scanning time for a given scanning range by halving the mirror swing angle, or to reduce the distance between the scanning apparatus and the cant while leaving the mirror swing angle unchanged, thus reducing the spacing between measurement points along the length of the cant with correspondingly increased measurement accuracy.

From the foregoing description taken with the accompanying drawings it will be apparent that this invention provides relatively simple and inexpensive apparatus for scanning a cant to determine the orientation that it should have during substantially lengthwise translatory motion through a pair of edging cutters, so that it will be converted to a finished workpiece of economically optimum size as determined by calculations made on the basis of the data obtained by scanning.

Those skilled in the art will appreciate that the invention can be embodied in forms other than as herein disclosed for purposes of illustration.

The invention is defined by the following claims.

I claim:

1. Apparatus for scanning an unfinished elongated workpiece having a substantially flat top surface that terminates at a pair of opposite, longitudinally extending side edges and having a pair of generally downwardly extending side surfaces that extend along its length and meet said top surface at the respective side edges, said apparatus producing signals as a result of such scanning that are related to the orientation and configuration of said side edges and their spacing from one another, said apparatus comprising:

A. workpiece supporting means defining an elongated scanning station which extends lengthwise in one horizontal direction and at which a workpiece can be held stationary with its top surface horizontal;
   B. a reflector having a flat reflecting surface;
   C. means mounting the reflector for flatwise swinging motion about a fixed horizontal axis which is parallel to said reflecting surface, said axis also being
      1. transverse to said one direction and
      2. so spaced above the supporting means that the reflector can reflect to a location above the supporting means an image of a zone which extends entirely across a workpiece on the supporting means and which moves lengthwise along the scanning station as the reflector swings about said axis;
   D. photoresponsive detector means fixed at said location to receive the image reflected by the reflector and arranged for repetitive electronic scanning at a predetermined rate along a line parallel to said axis;
   E. lens means located in an optical path between said reflector and said detector means and arranged to bring into focus at said detector means said image reflected in said reflecting means;
   F. actuating means for swinging the reflector about said axis towards and from a defined starting position and through at least one scanning traverse which starts with the reflector in said starting position, said actuating means maintaining a rate of swing of the reflector during said scanning traverse that is so related to the rate of repetitive scanning as to advance the imaged zone lengthwise along the scanning station from scan to scan; and
   G. lighting means comprising a plurality of light sources located at a level above the supporting means to cast illumination along the full length of the scanning station and to so illuminate a workpiece on the supporting means as to delineate each of said side edges thereon by illuminating only one of the two surfaces which meet at said side edge.

2. The scanning apparatus of claim 1 wherein said actuating means is arranged to effect a second scanning traverse immediately after the first one and in the opposite direction from the first one so that the reflector is in its starting position at the end of the second scanning traverse, and wherein said lighting means comprises two sets of light sources, one of which casts illumination that serves to delineate one of said side edges and the other of which casts illumination that serves to delineate the other of said side edges, further characterized by:

H. light control means synchronized with said actuating means for lighting only one of said sets of light sources during one of said scanning traverses and only the other set of light sources during the other scanning traverse.

3. The scanning apparatus of claim 2, wherein said actuating means is arranged to begin each scanning traverse with the reflector in said starting position and to swing the reflector back to the starting position after each scanning traverse.

4. The scanning apparatus of claim 1, further characterized by:
H. means for establishing a workpiece on said supporting means with one end of the workpiece in a predetermined position such that said imaged zone is adjacent to said end of the workpiece when the reflector is in its starting position.

5. The scanning apparatus of claim 4, wherein said actuating means is arranged to swing the reflector through an angle such that said imaged zone is advanced only along substantially half the length of the scanning station, further characterized by:
a second photoresponsive detector means, lens means, reflector, mounting means for the reflector, and actuating means, arranged like the first and mounted over the supporting means, horizontally spaced from the first in said direction, for scanning along the other half of the length of the scanning station.

6. Apparatus for scanning an unfinished elongated workpiece having a substantially flat top surface that terminates at a pair of opposite, longitudinally extending side edges and having a pair of generally downwardly extending side surfaces that extend along its length and meet said top surface at the respective side edges, said apparatus producing signals as a result of such scanning that are related to the orientation and configuration of said side edges and their spacing from one another, said apparatus comprising:
A. supporting means defining an elongated scanning station which extends lengthwise in one horizontal direction and at which a workpiece can be held stationary with its top surface horizontal and its length oriented substantially in said direction;
B. means at said scanning station defining a horizontal reference line extending in said one direction, the last mentioned means comprising a pair of upright stops which are spaced from one another in said direction and against which a workpiece can be engaged while held stationary at said scanning station;
C. a reflector having a flat reflecting surface;
D. means mounting said reflector for swinging motion by which its said reflecting surface is carried flatwise about a fixed horizontal axis which is
 1. parallel to said reflecting surface,
 2. transverse to said reference line, and
 3. so spaced above the supporting means that the reflector can reflect to a location above the supporting means an image of an elongated zone which extends lengthwise transversely to said direction and entirely across a workpiece on the supporting means and which moves along the scanning station lengthwise thereof, as the reflector swings about said axis;
E. photoresponsive detector means fixed at said location and arranged for repetitive electronic scanning at a predetermined rate along a line parallel to the length of said image, for producing signals corresponding to light reflected from a workpiece at the scanning station;
F. lens means located in an optical path between said reflector and said detector means and arranged to bring into focus at said detector means said image reflected in said reflector;
G. actuating means for swinging the reflector about said axis towards and from a defined starting position and through at least one scanning traverse which starts with the reflector in said starting position and during which the reflector swings at a rate so related to the rate of repetitive scanning as to advance the imaged zone lengthwise along the scanning station from scan to scan; and
H. means for so illuminating a workpiece at the scanning station as to delineate each of said side edges thereon by illuminating only one of the two surfaces which meet at said side edge.

7. The apparatus of claim 6, further characterized by:
I. means operatively associated with said actuating means and said detector means for producing relationship signals which can be employed to define the angular position of the reflector at the time of each electronic scan by the detector means.

8. The apparatus of claim 7, wherein said means for producing relationship signals comprises a pulse generator which produces a pulse each time the reflector attains one of a plurality of predetermined positions of its swinging motion.

* * * * *